United States Patent
Kunz et al.

(10) Patent No.: US 7,709,058 B2
(45) Date of Patent: May 4, 2010

(54) PROCESS FOR COATING METAL SHEET, ESPECIALLY ZINC SHEET

(75) Inventors: Andreas Kunz, Remscheid (DE); Eva Wilke, Hilden (DE); Wolfgang Lorenz, Erkrath (DE); Hans Clodt, Essen (DE)

(73) Assignee: Henkel KGaA (DE)

(*) Notice: Subject to any disclaimer, the term of this patent is extended or adjusted under 35 U.S.C. 154(b) by 0 days.

(21) Appl. No.: 11/835,041

(22) Filed: Aug. 7, 2007

(65) Prior Publication Data

US 2008/0026233 A1    Jan. 31, 2008

Related U.S. Application Data

(63) Continuation of application No. PCT/EP2005/012012, filed on Nov. 10, 2005.

(30) Foreign Application Priority Data

Feb. 8, 2005    (DE) .................. 10 2005 005 858

(51) Int. Cl.
  *B05D 1/36*    (2006.01)
  *B05D 3/02*    (2006.01)
(52) U.S. Cl. .......................................... 427/409
(58) Field of Classification Search .................. 427/409
  See application file for complete search history.

(56) References Cited

U.S. PATENT DOCUMENTS

| | | | |
|---|---|---|---|
| 5,260,120 A * | 11/1993 | Moyle et al. | 428/219 |
| 5,427,632 A | 6/1995 | Dolan | |
| 5,584,946 A | 12/1996 | Karmaschek et al. | |
| 5,868,872 A | 2/1999 | Karmaschek et al. | |
| 6,074,495 A | 6/2000 | Sung et al. | |
| 6,165,561 A * | 12/2000 | Blum et al. | 427/409 |
| 6,413,642 B1 * | 7/2002 | Wegner et al. | 428/418 |
| 6,835,459 B2 | 12/2004 | Lorenz et al. | |
| 6,875,479 B2 | 4/2005 | Jung et al. | |
| 2003/0175541 A1 | 9/2003 | Lorenz et al. | |
| 2003/0185990 A1 | 10/2003 | Bittner et al. | |
| 2004/0054044 A1 | 3/2004 | Bittner et al. | |
| 2005/0037208 A1 | 2/2005 | Ogino et al. | |

FOREIGN PATENT DOCUMENTS

| | | |
|---|---|---|
| CA | 2 374 539 A1 | 11/2000 |
| CA | 2 388 581 A1 | 4/2001 |
| DE | 199 23 084 A1 | 11/2000 |
| EP | 0 319 017 B1 | 4/1994 |
| EP | 0 319 016 B1 | 6/1994 |
| EP | 0 700 452 B1 | 7/1997 |
| EP | 1 479 736 A1 | 11/2004 |
| WO | WO 01/23452 A1 | 4/2001 |
| WO | WO 01/85860 A1 | 11/2001 |
| WO | WO 02/24344 A2 | 3/2002 |
| WO | WO 03/035280 A2 | 5/2003 |

OTHER PUBLICATIONS

International Search Report for WO 2006/084491 A1 (Aug. 17, 2006).
Electrical apparatus for potentially explosive atmospheres-Powder filling "q", BS EN 50017 English version of DIN 50017 (Sep. 1998).
Coil Coated Metals—Test Methods, Part 6: Adhesion after indentation (cupping test), DIN EN ISO 13523-6, Beuth Verlag GmbH, Berlin (Oct. 2002).
Paints and Varnishes—Cross-cut Test, DIN EN ISO 2409, Beuth Verlag GmBH, Berlin (Oct. 1994).
Paints and Varnishes—Evaluation of degradation of coatings, DIN EN ISO 4628-1 (Supersedes DIN 53230), Beuth Verlag GmbH, Berlin (Jan. 2004).

* cited by examiner

*Primary Examiner*—Erma Cameron
(74) *Attorney, Agent, or Firm*—Mary K. Cameron

(57) ABSTRACT

A process for coating metals, selected from aluminum and its alloys, zinc and its alloys, and galvanized or alloy-galvanized steel, in which the metal is given a weather-resistant protective coating, wherein the metal is cleaned if necessary, and thereafter subjected to a conversion treatment; optionally flushed with water and/or dried; brought into contact with a coating agent which comprises aliphatic cross-linking urethane resins, cross-linking agents, anti-corrosion pigments, one or more organic solvents and/or water and, if desired, other active or auxiliary substances; and then cured.

16 Claims, No Drawings

PROCESS FOR COATING METAL SHEET, ESPECIALLY ZINC SHEET

CROSS-REFERENCE TO RELATED APPLICATIONS

This application is a continuation under 35 USC Sections 365(c) and 120 of International Application No. PCT/EP2005/012012, filed 10 Nov. 2005 and published 17 Aug. 2006 as WO 2006/084491, which claims priority from German Application No. 10 2005 005 858.2, filed 8 Feb. 2005, each of which is incorporated herein by reference in its entirety.

FIELD OF THE INVENTION

The present invention concerns a process by means of which metals, selected from aluminum and its alloys, galvanized or alloy-galvanized steel, and especially zinc or zinc alloys can be given a weather-resistant protective coating. In contrast to paint coatings, it is intended that the metallic appearance of the metal substrate be retained as much as possible. The process is suitable for the metals and metal alloys named above. It is particularly intended for coating sheets or shaped parts from such sheets of zinc or zinc alloys. The importance of the objective of the invention, and its solution, and the advantages of the solution according to the invention are therefore explained with reference to zinc and zinc alloys as non-limiting examples, it being understood that the disclosure applies to other metals disclosed herein.

The coated parts made of zinc or zinc alloys are intended particularly for applications in which they are exposed to the effects of weather, such as sunlight and rain. Application of the protective coating is intended to make a distinct reduction in the dissolution of zinc from the metal surface due to the effects of weathering, thus reducing the entry of zinc into the environment (water and/or soil), in comparison with uncoated zinc.

Solid strips or plates of zinc (where "zinc" is understood, here and in the following, to include also zinc alloys containing at least 50% by weight zinc) can be produced, for instance, by rolling or by continuous casting and rolling processes. They are employed primarily in architecture, in which different shaping and joining processes are required, depending on the application. The most common joining process for zinc parts is brazing. Zinc sheets and zinc parts obtained in that manner are used, for instance, in making facades, as roofs or gateways, or as rain gutters and down-spouts. They are also used predominantly in locations in which they are exposed to sunlight and rain. Because of that, zinc is eroded on one surface, so that zinc compounds get into water and soil. In addition, there is some formation of a surface patina of difficultly soluble zinc compounds that partially, but not sufficiently, protect from atmospheric corrosion. Depending on the thickness of the material, development of a natural patina is accompanied by lifetimes of several decades. Nevertheless, the problem arises, principally for environmental protection, of further slowing the dissolution of the zinc substrate and thus slowing the entry of zinc compounds into the environment.

As the natural patina can not only extend the life of the zinc substrate but also result in a desirable visual aesthetic impression, formation of the natural patina may be highly desirable. Depending on the general weathering situation (climate) and the direction of the weathering of the zinc object, complete development of the natural patina may be complete only after several years. There can be intermediate situations which appear as spotty unevenly developed coatings. That is perceived as visually unpleasant. Strips, sheets or parts of zinc, direct from the plant, are etched, if desired, to cause formation of a patina-like coating. This process is also known as "preweathering". In this way one anticipates the homogeneous coloring of natural aging. The resulting preweathering layer consists essentially of zinc sulfate, zinc carbonate, and zinc oxides.

Such a preweathering step can precede the inventive coating process described here. Therefore the process according to the invention is designed so that the protective layer produced adheres to the preweathering layer, and also so that the visual impression of this preweathering layer is obstructed as little as possible. Whether or not such preweathering is done, the protective layer applied with the process of the invention must not impede shaping and joining processes such as pressing and brazing. It must not flake off in shaping processes.

In practice, an acrylate-based coating is already being applied to zinc as temporary corrosion protection. However, this coating does not fulfill the requirement for permanent corrosion protection such as the process of the invention is intended to produce.

"Conversion treatments" are widely used to pretreat metal surfaces before a coating based on film-forming organic polymers (resins). These are understood to be surface treatments in which the metal surface is brought into contact with a 'conversion solution'. That contains components that can form difficultly soluble compounds with the metal atoms of the metal surface being treated. Chromating is an example of that. In this process, the metal surface is brought into contact with an acidic aqueous solution containing Cr(III) and/or Cr(VI) compounds. Such chromating processes are increasingly being avoided for work protection and environmental protection. They are often replaced by treatment processes in which the metal surface is brought into contact with acid treatment solutions that contain complex fluorides of one or more of the elements B, Si, Ti, Zr or HF.

For instance, Document EP-B-700 452 describes chromium-free processes for pretreating aluminum surfaces before a second, final conversion treatment to protect against corrosion. In this case, the surfaces are brought into contact with an acidic aqueous treatment solution containing complex fluorides of the elements B, Si, Ti, Zr or Hf, individually or mixed with each other, with total fluoroanion concentrations between 100 and 4,000 mg/liter and a pH between 0.3 and 3.5. In its introduction, that document cites a whole series of other sources in which chromium-free conversion solutions are described. We refer in particular to page 3 of the specified document. According to the sources cited there, the conversion solutions may contain film-forming organic polymers such as polyacrylic acid, or their salts or esters, aside from the complex fluorides. It also appears from the sources cited there that the conversion solutions may contain polyvinylphenol compounds as film-forming polymers. They can be obtained by reacting poly(vinylphenol) with aldehydes and organic amines.

Other examples of conversion solutions with which metal surfaces can be pretreated before application of a permanent anticorrosion organic coating can be found in DE-A-199 23 084 and in the literature cited therein. According to this teaching, a chromium-free aqueous conversion agent may contain not only hexafluoro anions of Ti, Si and/or Zn but also other active substances: phosphoric acid, one or more compounds of Co, Ni, V, Fe, Mn, Mo, or W, a water-soluble or water-dispersible film-forming organic polymer or copolymer, and organophosphonic acids which have complexing properties. On page 4 of that document, lines 17 to 39, there is an extensive list of organic film-forming polymers that can be contained in the conversion solutions mentioned. In connection with that, the document discloses a very extensive list of complex-forming organophosphonic acids as further potential components of the conversion solutions.

Application of organic coatings that contain, among other things, a polyurethane resin or a prepolymer as the film-forming component to metal surfaces, pretreated in the sense of a conversion treatment, is also known. The following are examples of that:

The document WO 01/23452 discloses an aqueous composition for coating stainless steel, containing a) at least one dispersed polyurethane prepolymer with at least partially blocked isocyanate groups; b) at least one other cross-linkable polymer dispersion or polymer solution and c) optionally wetting and dispersing agents and flow improvers. The dispersed blocked polyurethane prepolymer can be built up of low-molecular-weight polyols and aliphatic diisocyanates. The blocking agent for the isocyanate groups can be selected from aldoximes, ketoximes, lactams, imidazole compounds, β-dicarbonyl compounds, alcohols, phenols, thioalcohols, thiophenols, secondary amines, amides, imides or hydroxamic acid esters. That document also contains, in its claim 4, a list of examples of aliphatic or cycloaliphatic diisocyanates as components of the polyurethane prepolymer. The cross-linkable polymer b) can, for instance, be selected from reactive (meth)acrylate copolymers, polyurethane dispersions based on polyesterol, polycarbonate, or polyether. This agent is intended particularly to be applied to stainless steel surfaces as a dirt-repelling coating.

The document WO 03/035280 discloses surface-coated Al/Zn-steel sheets and a corresponding surface-coating agent. The core of this disclosure is in that a coating that contains a resin containing an acid amide compound as the principal component is formed on the surface of such a steel sheet. That resin can be a polyurethane resin, for instance. Examples mentioned of other optional components of this coating agent include silicic acid, silicic acid salts, colloidal silicon dioxide and silane-coupling reagents.

Anticorrosion coating for steel strips are known from EP-A-1 479 736. They contain a carrier material and a corrosion-inhibiting quantity of a matrix capable of cation exchange, such that this matrix capable of cation exchange contains cations that form insoluble precipitates with hydroxyl ions. This matrix can, for instance, consist of natural or synthetic laminar silicates. The exchangeable cations present can be: Ca, Ce, Sr, La, Y, Al or Mg.

The objective of the present invention is to provide a special coating process for surfaces of sheets or solid zinc parts which meets the requirements specified above. However, it is preferable for this coating process also to be used for metals other than zinc, such as aluminum and its alloys, and for galvanized or alloy-galvanized steel. That is particularly the case if these materials are also to be exposed to the effects of sunlight and weathering. Thus the application of the process described below to zinc and zinc alloys represents only a preferred embodiment of the invention.

The solution to this problem consists of a process for coating metals, selected from aluminum and its alloys, zinc and its alloys, and galvanized or alloy-galvanized steel, in which the metal is cleaned if necessary, a) subjected to a conversion treatment which is itself known at the state of the art by contact with a conversion solution that contains at least one simple or complex salt of at least one metal M, whereby a conversion layer containing 0.01 to 0.7 mmol/m² of metal M is produced;
   b) flushed with water and/or dried, if desired,
   c) brought into contact with a coating agent which comprises c1) a total of 5 to 30 percent by weight of one or more aliphatic cross-linking urethane baking resins,
   c2) a total of 10 to 30 percent by weight of one or more cross-linking agents for component
   c3) 4 to 30 percent by weight of one or more anti-corrosion pigments, with the remainder comprising one or more organic solvents and/or water and, if desired, other active or auxiliary substances, and then
   d) the coating obtained in partial step c) is cured by heating to a substrate temperature of at least 100° C.

A chromium-containing or, preferably, chromium-free conversion solution can be used in partial step a), as is known from the state of the art cited initially. By choice of process parameters such as the treatment temperature, duration of treatment, and contact time, one can make sure that a conversion layer that contains 0.01 to 0.7 mmoles of metal M per square meter of surface is obtained, representing the essential component of the conversion solution. Examples of metal M include Cr(III), Cr(VI), B, Si, Ti, Zr, and Hf. The density of coverage of the zinc surface with metal M can be determined with an X-ray fluorescence method, for example.

Conversion solutions containing no intentionally added silane are preferred for partial step a). At the least, the silane content should not exceed 10 ppm, based on the conversion solution. With higher silane contents there is a danger that the organic coating applied in the subsequent partial step c) will peel off.

For ecological reasons, the conversion solution in partial step a) is preferably free of chromium. It is preferable for an aqueous chromium-free solution containing the metal M in the form of complex fluorides to be used in this step. Ti, Zr, or their mixtures are preferred as the metal M. However, the treatment solution can also contain complex fluorides of B, Si, and/or Hf. Other optional components include those mentioned in the document DE-A-199 23 084, cited above: phosphoric acid, compounds of Co, Ni, V, Fe, Mn, Mo or W, a water-soluble or water-dispersible film-forming organic polymer or copolymer such as complex-forming organophosphonic acids. Specific examples of these components can be found in the cited DE-A-1 99 23 084.

It is especially preferred for partial step a) to use acidic aqueous conversion solutions containing, aside from complex fluorides of Ti and/or Zr, organic polymers selected from homopolymer or copolymer compounds containing amino groups, comprising at least one polymer selected from the group consisting of a), b), c) or d), in which:

a) comprises a polymeric material having at least one unit of the formula "(I)":

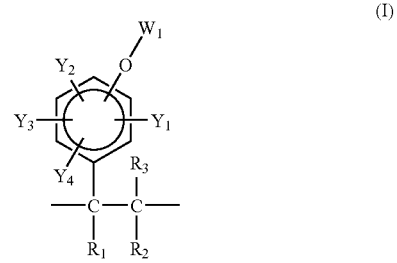

in which:

$R_1$ to $R_3$, are selected, independently for each of the units, from the group comprising hydrogen, an alkyl group with 1 to 5 carbon atoms, or an aryl group with 6 to 18 carbon atoms;

$Y_1$ to $Y_4$, are selected, independently for each of the units, from the group comprising hydrogen, —$CR_{11}R_5OR_6$, —$CH_2Cl$, or an alkyl or aryl group having 1 to 18 carbon atoms, or Z, where Z has the formula "(II)" or "(III)":

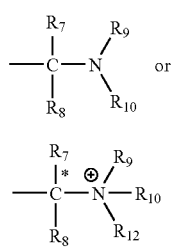

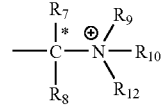

but at least one fraction of the $Y_1$, $Y_2$, $Y_3$ or $Y_4$ of the homopolymeric or copolymeric compound or material Z must be: $R_5$ to $R_{12}$, selected independently for each of the units from the group comprising hydrogen, an alkyl-, aryl-, hydroxyalkyl, aminoalkyl, mercaptoalkyl or phosphoalkyl group; $R_{12}$ can also be $O^{(-1)}$ or —OH;

W is selected independently for each of the units from the group comprising hydrogen, an acyl, an acetyl, a benzoyl group: 3-allyloxy-2-hydroxypropyl; 3-benzyloxy-2-hydroxypropyl, 3-butoxy-2-hydroxypropyl, 3-alkyloxy-2-hydroxypropyl, 2-hydroxyoctyl, 2-hydroxyalkyl, 2-hydroxy-2-phenylethyl, 2-hydroxy-2-alkylphenylethyl; benzyl; methyl; ethyl; propyl; alkyl; allyl; alkylbenzyl; haloalkyl; haloalkenyl; 2-chloropropenyl; sodium; potassium; tetraarylammonium; tetraalkylammonium; tetraalkylphosphonium; tetraarylphosphonium or a condensation product of ethylene oxide, propylene oxide or a mixture or a copolymer of them;

b) comprises:

a polymeric material comprising at least one unit of the formula "(IV)"

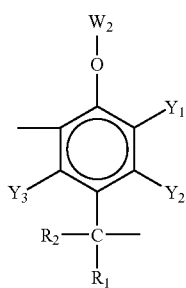

in which:

$R_1$ to $R_2$, are selected, independently for each of the units, from the group comprising hydrogen, an alkyl group with 1 to 5 carbon atoms, or an aryl group with 6 to 18 carbon atoms;

$Y_1$ to $Y_3$ are selected, independently for each of the units, from the group comprising hydrogen, —$CR_4R_5OR_6$, —$CH_2Cl$, or an alkyl or aryl group having 1 to 18 carbon atoms or Z, where Z has the formula "(II)" or "(III)":

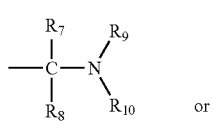

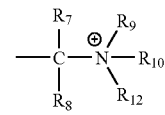

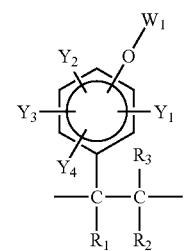

but at least one fraction of the $Y_1$, $Y_2$ or $Y_3$ must be the final compound Z; $R_4$ to $R_{12}$ are selected, independently for each of the units, from the group comprising hydrogen, an alkyl, aryl, hydroxyalkyl, aminoalkyl, mercaptoalkyl or phosphoalkyl group; $R_{12}$ can also be —$O^{(-1)}$;

W is selected independently for each of the units from the group comprising hydrogen, an acyl, an acetyl, a benzoyl group: 3-allyloxy-2-hydroxypropyl; 3-benzyloxy-2-hydroxypropyl; 3-alkylbenzyloxy-2-hydroxypropyl; 3-phenoxy-2-hydroxypropyl; 3-alkylphenoxy-2-hydroxypropyl; 3-butoxy-2-hydroxypropyl; 3-alkyloxy-2-hydroxypropyl; 2-hydroxyoctyl; 2-hydroxyalkyl; 2-hydroxy-2-phenylethyl, 2-hydroxy-2-alkylphenylethyl; benzyl; methyl; ethyl; propyl; alkyl; allyl; alkylbenzyl; haloalkyl; haloalkenyl; 2-chloropropenyl; or a condensation product of ethylene oxide, propylene oxide or a mixture of them;

c) comprises:

a copolymer material in which at least a part of the copolymer has the structure of formula "(I)"

and at least a fraction of the specified portion is polymerized with one or more monomers selected, independently for each unit, from the group comprising acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostyrene, p-bromostyrene, pyridine, diallyldimethylammonium salts, 1,3-butadiene, n-butyl acrylate, tert.-butylaminoethyl methacrylate, n-butyl methacrylate, tertbutylmethacrylate, n-butyl vinyl ether, tert.-butyl vinyl ether, m-chlorostyrene, o-chlorostyrene, p-chlorostyrene, n-decyl methacrylate, N,N-diallylmelamine, N,N-di-n-butyl acrylamide, di-n-butyl itaconate, di-n-butyl maleate, diethylaminoethyl methacrylate, diethyleneglycol monovinyl ether, diethyl fumarate, diethyl itaconate, diethylvinyl phosphate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-docecyl vinyl ether, acidic ethyl fumarate, acidic ethyl maleate, ethyl acrylate, ethyl cinnamate, N-ethylmethacrylamide, ethyl methyl acrylate, ethyl vinylether, 5-ethyl-2-vinylpyridine, 5-ethyl-2-vinylpyridine-1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-isobutoxymethyl acrylamide, N-isobutoxymethyl methacrylamide, N-alkoxymethyl acrylamide, N-alkyloxy-methyl methacrylamide, N-vinyl caprolactam, methyl acrylate, N-methyl methacrylamide, α-methylstyrene, m-methylstyrene, o-methylstyrene, p-methylstyrene, 2-methyl-5-vinylpyridine, n-propylmethacrylate, sodium p-styrenesulfonate, stearyl methacrylate, styrene, p-styrenesulfonic acid, p-styrenesulfonamide, vinyl bromide, 9-vinylcarbazol, vinyl chloride, vinylidene chloride, 1-vinylnaphthalene, 2-vinylnapthalene, 2-vinylpyridine, 4-vinylpyridine, 2-vinylpyridine N-oxide, 4-vinyl pyrimidine, N-vinyl pyrrolidone; and $W_1$, $Y_1$-$Y_4$ and $R_1$-$R_3$ are as described for formula "(I)" under a), above;

d) comprises a condensation polymer from the polymeric materials a), b), or c), in which a condensable form of a), b) or c) or a mixture of them is condensed with a second compound selected from the group consisting of phenols, tannins, Novolac resins, lignin compounds, along with aldehydes, ketones or mixtures of them, to produce a condensation resin product, whereby the condensation resin product then reacts further, by addition of "Z" to at least part of it, through reaction of the resin product with 1) an aldehyde or ketone 2) a secondary amine, forming a final adduct that can react with an acid.

Processes for producing such polymers are described in patents EP-B-319 016 and EP-B-319 017. Polymers of this type can be obtained from the Henkel Corporation USA, under the trade names Parcolene® 95C, Deoxylyte® 90A, 95A, 95AT, 100NC and TD-1355-CW.

Particularly preferred polymers are those in which at least a fraction of the Z groups of the organic polymer have a polyhydroxylalkylamine functionality derived from condensation of ammonia or an amine with a ketose or aldose having 3 to 8 carbon atoms. The condensation products can optionally be reduced to the amine.

Other examples of such polymers are condensation products of a poly(vinylphenol) with formaldehyde or paraformaldehyde and with a secondary organic amine. Preferably one works with poly(vinylphenol)s having molecular weights in the range of approximately 1,000 to 10,000. Condensation products in which the secondary organic amine is selected from methylethanolamine and N-methylglucamine are particularly preferred.

For instance, a product marketed by Henkel KGaA, Düsseldorf, under the trade name Granodine® 1456 is suitable for the conversion treatment in partial step a). It comprises hexafluoroacids of titanium and zirconium, phosphoric acid, manganese ions, organic phosphonic acid (1-hydroxyethane-1,1-diphosphonic acid) and organic polymer according to the patents cited above, EP-B-319 016 and EP-B-319 017. It is particularly preferable to select a polymer containing N-methylglucamine groups.

The conversion solution in partial step a) preferably has a temperature in the range between 10 and 50° C., and especially between 15 and 35° C. The contact time of the conversion solution with the metal surface (defined either as the time from the beginning of contact to the beginning of the water flush, or the time from the beginning of contact to the beginning of drying) can be in the range of 1 second to 2 minutes. As the entire process is preferably done with continuously moving metal strips, contact times common for strip treatments are preferred. These are contact times in the range of 2 to 20 seconds.

After the end of the contact time, the strip can be flushed with water and then dried. A water flush is particularly recommended if the treatment process according to the invention is done on preformed parts. In that case, the contact with the conversion solution is preferably accomplished by immersion in or spraying with the solution. However, if the sequence of processes according to the invention is done on moving metal strips, as preferred, it is preferred to apply the conversion solution in partial step a) by roller application, thereafter not flushing but going directly to drying (no-rinse process). The drying is preferably done by drying in air at a substrate temperature of 60 to 90° C. (peak metal temperature, hereinafter referred to as "PMT").

In partial step c) it is preferable to apply a quantity of the coating agent such that, after the curing step d), the layer thickness is in the range of 3 to 35 μm preferably in the range of 6 to 20 μm. The coating thickness can be controlled by the manner of applying the coating agent and by its viscosity. The viscosity is primarily a function of the solids content of the coating agent and can be adjusted by that. For preformed parts, the coating in partial step d) can be done by immersing in or by spraying with the coating agent. If the process according to the invention is done on moving metal strips, as preferred, a roller application process is particularly preferred. However, the application can also be accomplished by spraying the strip with the coating agent or by passing the strip through a bath containing the coating agent and then squeezing off with doctor rolls. The contact time (as defined above for partial step a)) is preferably 2 to 20 seconds.

In partial step d) the coating obtained in partial step c) is cured by heating to a substrate temperature (PMT) of at least 100° C. The substrate temperature (PMT) is preferably not greater than 210° C.

The heating to the required substrate temperature (PMT) can be accomplished, for instance, by infrared radiation or, preferably, in a circulating-air drying oven. The time to reach the PMT is a sufficient duration for curing.

The cross-linking urethane baking resin c1) is used preferably as a suspension or solution of a prepolymer having blocked isocyanate groups. To attain the desired resistance to solar radiation, the urethane resin must have at least extensive aliphatic hydrocarbon chains. Aromatic and/or unsaturated groups must be avoided as much as possible. In this sense, a urethane resin is designated here as aliphatic if there are no more than 5%, preferably no more than 1% of the carbon atoms present in aromatic and/or unsaturated groups.

Component c1) is preferably a preparation of a polyurethane prepolymer that contains essentially no more free isocyanate groups. This polyurethane prepolymer is built up in the known manner from hydroxyl-functional polyesters or hydroxy-functional acrylates and aliphatic or cycloaliphatic polyisocyanates. The aliphatic or cycloaliphatic polyisocyanates used for this purpose are preferably selected from the group of 4,4-dicyclohexylmethane diisocyanate ($H_{12}$MDI), 1-isocyanatomethyl-3-isocyanato-1,5,5-trimethylcyclohexane (isophorone diisocyanate, IPDI), cyclohexane-1,4-diisocyanate, hydrogenated xylylene diisocyanate ($H_6$XDI), 1-methyl-2,4-diisocyanatocyclohexane, meta- or para-tetramethylxylene diisocyanate (m-TMXDI, p-TMXDI), dimeric fatty acid diisocyanate, tetramethoxybutane-1,4-diisocyanate, butane-1,4-diisocyanate, hexane-1,6-diisocyanate (HDI, as particularly preferred here), 1,6-diisocyanato-2,3,4-trimethylhexane, 1,6-diisocyanato-2,2,4-trimethylhexane, and 1,2-dodecane diisocyanate ($C_{12}$DI).

Optionally the corresponding trimeric products from biuretizing or isocyanuratizing can also be used as the previously cited diisocyanates.

Polyesters having molecular weights between 400 and 10,000, preferably between 400 and 5000, which can be prepared by condensation of dicarboxylic acids or tricarboxylic acids, such as adipic acid, sebacic acid, glutaric acid, azelaic acid, suberic acid, 3,3-dimethylglutaric acid, terephthalic acid, isophthalic acid, hexahydrophthalic acid or dimer fatty acid with low-molecule weight diols or triols such as ethylene glycol, propylene glycol, diethylene glycol, triethylene glycol, dipropylene glycol, 1,4-butanediol, 1,6-hexanediol, 1,10-decanediol, dimer fatty alcohol, glycerin or trimethylolpropane are suitable polyols. Polyesters based on ε-caprolactam, also known as "polycaprolactones", are another group of polyols that can be used according to the invention. Hydroxyfunctional polycarbonates can also be used as polyol components for the polyurethane preparation to be used according to the invention.

However, polyester polyols of oleochemical origin can also be used. Such polyester polyols can, for instance, be produced by complete ring opening from epoxidized triglycerides of a fat mixture containing at least partially olefinically unsaturated fatty acids with one or more alcohols having 1 to 12 C atoms and then partial transesterification of the triglyceride derivative to give alkyl esterpolyols having 1 to 12 C atoms in the alkyl group. Other suitable polyols are polycarbonate polyols and dimer diols (Henkel) as well as castor oil and its derivatives. The polytetramethylene glycols, which are produced, for instance, by the acid polymerization of tetrahydrofuran, are also usable as polyols, at least along with others. The molecular weight range for the polytetramethylene glycols is between 200 and 6,000, preferably in the range of 400 to 4,000.

The hydroxy-functional acrylates or methacrylates, which are themselves known, can also be used as polyols. Their molecular weight range is between about 400 and 10,000.

The molecular weights of the starting materials mentioned are generally stated by the manufacturers without reference to the method of determination. These are the starting materials, suitable or preferred, for which the manufacturers report the corresponding molecular weights or molecular weight ranges.

If the polyurethane resin preparations are aqueous systems, or are to be incorporated into such systems, the polyurethane prepolymers have, as a rule, no free isocyanate groups. Rather, they are blocked, at least to a large extent, using blocking agents. These blocking agents can be selected from aldoximes, ketoximes, lactams, imidazole compounds, β-dicarbonyl compounds such as dialkyl malonic acid esters or acetoacetic acid esters. Other blocking agents, which are themselves known, can be alcohols, phenols, especially alkylphenols, thioalcohols, thiophenols, secondary amines, amides, imides or hydroxamic acid esters. These blocking groups are released on curing or cross-linking of the binder system, optionally involving catalysts, so that the isocyanate groups that are liberated then can react with other reactive groups such as hydroxyl groups or amino groups from other binder constituents, thus contributing to the growth of molecular weight or to cross-linking of the binder system.

It is preferable to use a polyurethane prepolymer, the isocyanate groups of which are blocked with a protecting group that splits off at a temperature in the range of 100 to 180° C. That assures that the protective group separates during heating to the PMT in partial step d), so that the coating can cure by reaction of the polyurethane resin with the cross-linking agent c2). Phenols, caprolactams, special amines and oximes are preferred blocking agents with this property. The PMTs during curing must be matched to the protective groups so that the protective group separates below the PMT.

During curing in partial step d), the cross-linking agent c2) reacts with the terminally blocked isocyanate groups of a urethane baking resin, so that the entire organic binder system cures. The cross-linking agent must therefore have groups that are reactive with terminally blocked isocyanate groups. Those are hydroxyl groups in particular. There it is preferred that the cross-linking agent itself be a prepolymer. For example, it can be selected from these polymers that contain hydroxyl groups: polyacrylates, polyethers, polyesters, polycarbonates, polycarbonate-polyester, and mixtures of them.

The pigment that protects against corrosion c3) is preferably selected from inorganic pigments that contain cations of bivalent or multivalent metals that can exchange with alkali metal ions. In particular, those exchangeable cations of bivalent or multivalent metals are preferred that form compounds poorly soluble in water with hydroxyl ions, such as can occur on corrosion of the metal surface. Those compounds having solubility constants lower than $10^{-32}$ in water at room temperature (20° C.) are considered "poorly soluble". Thus those anticorrosion pigments that are listed under the general designation of "cation exchange matrix" in the previously cited document EP-A-1 49 736 are suitable.

Particularly preferred anticorrosion pigments are those based on silicates with laminar or space-network structures, which contain exchangeable cations of bivalent or multivalent metals. The cations preferred here are the cations of Ca, Ce, Zn, Sr, La, Y, Al and Mg. For instance, the anticorrosion pigment can be a synthetic amorphous silicic acid that occurs at least partially in the form of its salt with exchangeable calcium ions.

In order to correspond with the desired coating thickness of the organic coating agent, the mean particle size of the anticorrosion pigment (D50 value, which can be determined by light-scattering methods, for example) is in the range of 0.5 to 10 μm. An average particle size in the range of 2 to 4 μm is preferred.

The coating agent c) comprises, along with the solids c1), c2) and c3) mentioned, one or more organic solvents and/or water and can also contain other active or auxiliary substances typical of paints. If organic solvents are present, they preferably have a flash point above 21° C. Presence of solvents in the coating agent is at least partly because components c1) and/or c2) are supplied as the solution or suspension in organic solvents.

Examples of solvents are: 1-methoxypropyl acetate-2, solvent naphtha, optionally mixed with dibasic esters, butyl diglycol acetate and methoxyisopropanol. However, other organic solvents are also possible, as long as they can be vaporized off in the curing step d). The table of exemplary embodiments contains other examples of them.

The coating agent preferably contains antisettling agents as a further aid. Pyrogenic silicic acid is particularly suitable for that purpose.

The coating agent should exhibit a viscosity adapted to the manner of application at the temperature of application. The viscosity of the agent is particularly influenced by the weight ratio of solids to solvent. The solids content of the coating agent in partial step c) is preferably at least 30% by weight; especially at least 40% by weight, but not more than 80% by weight, especially not over 70% by weight, based, in each case, on the coating agent ready for use. Here "solids content" is understood to be that part of the solvent that remains at the desired PMT. In this determination of the solids content the protective groups of the urethane baking resin can have separated. But that is not significant for the practical determination of the solids content, as the protective groups represent only a very small proportion of the entire coating agent, and because the accuracy attained in determining the solids content by evaporating the solvent is generally not better than 1%. That is entirely adequate for practical purposes.

The anticorrosive action of the coating applied in partial step c) depends on the weight ratio of the anticorrosion pigment c3) to the organic binder (i.e., the sum of components c1) and c2)). Good anticorrosion effect is attained if this ratio is at least 0.1, preferably 0.2 and not over 0.75, preferably not over 0.6. With a low weight ratio the anticorrosion action diminishes gradually. Higher weight ratios have increasingly bad effects on adherence of the organic coating to the substrate.

The metal sheet to be coated by the process of the invention, preferably zinc sheet (which is understood to include sheet of zinc alloys comprising more than 50% by weight zinc) can be individual sheets, a continuous strip, or sheet already transformed into shaped parts, and optionally joined sheets. Individual sheets and shaped parts can be coated by immersion in the individual treatment agents for the partial steps a) and c), or by spraying them with those agents. However, the process of the invention is particularly suitable for use in the so-called no-rinse process for continuous metal strips. Then partial steps a) and c) are performed in a roller coating process, without any water rinse between those partial steps and the curing step d). Such a process is particularly environmentally friendly because there is no contaminated flushing water. It has the further advantage that no treating liquids run back into the treatment bath or into a supply tank after they have been brought into contact with the metal surface. That prevents contamination of the treatment liquids.

The surface of the zinc sheet can be bright from the rolls, as is the case for freshly made ribbons, before application of the coating process according to the invention. However, the sheet can also have been surface-treated as a temporary measure for corrosion protection. The process of the invention is also suitable for plates that can be chemically aged or "preweathered". As mentioned in the introduction, such a treatment simulates the visual effect of a natural patina. It is preferable to use dilute solutions of strong acids, such as sulfuric acid and/or nitric acid for such preweathering. For chemical aging, which also gives a patina-like layer, one can also use alkaline carbonate solutions. In this case, zinc hydroxides and/or zinc carbonates deposit on the surface of the sheet. On the other hand, it is principally zinc oxides that form on acid preweathering.

The zinc sheet can also be subjected to a typical cleaning or activation before the coating process of the invention. That can be done chemically (alkaline or acidic cleaning or pickling) or mechanically (as by brushes).

The result of the process of the invention is a surface-coated metal sheet, preferably a zinc sheet (optionally in the form of a shaped piece) on which, ideally, the bright metallic or pretreated metal surface still shows through. Therefore the plates retain their metallic or patina-like appearance. That is generally particularly desirable for aesthetic reasons. Accordingly, there is generally no provision for painting over the coating produced with the process of the invention. However, that does not rule out the possibility that a paint layer on the organic coating applied in partial step c) will adhere significantly better than on a sheet that has not been pretreated. Also, the impression of a painted metal surface can, if desired, be produced without further painting over by adding dyes or colored pigments to the coating agent for partial step c).

The objectives presented initially are attained by the coating process according to the invention. Resistance of zinc sheet to white rust formation (measurable, for example, in a weathering test according to DIN 50017 KW) is improved. At the beginning of an open-air weathering test there is no elution of zinc ions, due, for example, to peeling of preformed corrosion products on the zinc surface. Elution of zinc ions in the long-term test is distinctly reduced in comparison with an untreated zinc surface. The coating applied is quite light-resistant, so that no chalking, discoloration or cracks occur in a UV test. The improved long-term corrosion protection especially also attains the objective of reducing entry of zinc into run-off rainwater and/or into the soil.

Furthermore, the coating produced with the process of the invention meets the requirement for adherence of the coating on shaping of coated parts. The coating applied according to the invention does not prevent joining processes such as brazing in particular. The coating is thin enough that it is removed it is penetrated by the brazing flux when places to be brazed are prepared by applying (acidic or alkaline) brazing flux, and is removed by the brazing flux when the zinc surface is etched. Therefore the plates coated according to the invention can be brazed as usual without a requirement for special measures to prepare for brazing.

A further objective of the present invention is a metal sheet, especially a zinc sheet, that bears a coating that can be obtained according to the process described by the invention, a part shaped from such a metal sheet, or an object that contains such a metal sheet or a shaped part from it.

The invention further concerns the use of such a metal sheet, shaped part, or object in the outer region of buildings. Parts for covering roofs, facades, dormers, and other building parts are examples of zinc sheets and shaped parts of zinc sheet coated according to the invention and their use. Shaped parts can, for instance, be used for roof drainage systems such as rain gutters and downspouts. They can also be used as parts of solar systems. Other exemplary applications are covers for window sills or as doors.

All these different uses have in common that the zinc surface coated according to the invention is exposed to the effects of weathering and sunlight. Resistance of the zinc surface to those effects is distinctly improved in comparison to untreated zinc sheet or zinc sheet with the usual treatment, by application of the coating process according to the invention. The environmental protection objective of reduced zinc entry is attained.

EXAMPLES

A commercial no-rinse conversion solution (Granodine®1456, Henkel KgaA, Düsseldorf) was applied with a laboratory coater (i.e., with a roller process) to preweathered zinc sheet (Rheinzink, TAC slate-grey, 0.7 mm thick). This acidic aqueous conversion solution was free of chromium and silanes, and contained complex fluorides of titanium and zirconium, phosphoric acid, manganese ions, 1-hydroxyethane-1,1-diphosphonic acid and a N-methylglucamine-substituted polyvinyl phenol according to the patents EP-B-319 016 and EP-B-319 017 cited in the description. This treatment solution was dried, without rinsing with water, in a circulating air oven at an oven temperature of 180° C. The time duration between application and transfer to the oven was about 10 seconds. The plates remained in the oven for about 12 seconds, so that a substrate temperature PMT of 80° C. was attained. The layer coverage was 10 mg Ti per square meter.

Then coating agents according to the table below were applied with a spiral doctor blade. The layer thicknesses after curing were approximately 8 μm. The coated sheets were cured in a circulating-air oven at an oven temperature of 280° C. without a water flush. The residence time in the oven was approximately 38 seconds, so that a PMT of 180° C. was attained. The coating thicknesses after curing were approximately 8 μm.

Standard tests for corrosion protection, coating adherence, and light resistance were done on the coated sheets.

Condensate water test according to German Standard DIN 50017 KFW (alternating climate). The test involves repeating cycles in which the sheets are stored in a moist atmosphere in a test chamber with heatable water tanks so that water condenses on the sheets. The test chamber is opened or ventilated after 8 hours. The test chamber remains in that state for 16 hours. Then it is closed and the cycle begins again. The number of cycles until appearance of white rust is stated in the tables. The greater the number of cycles, the better the corrosion protection is. The test was ended after 25 cycles at the most.

Adhesion testing after indenting according to German Standard DIN EN ISO 13523-6 (English: cupping test). In this test the coated test sheet is cross-cut with a cutting tool (at least 6 parallel cuts 1 mm apart, with at least 6 additional similar cuts at a right angle to them). Each cut must penetrate just to the metal substrate. The test sheet is bulged out at the site of the cross-cutting by means of a deep-drawing device by pressing a ram from the back side. The depth of the impression is about 80% of the depth at which the metallic substrate tears. To evaluate the adhesion, an adhesive tape is evenly adhered to the coating at the site of the cross-cutting and then pulled off. The adhesion of the coating is then evaluated by the number of squares produced by the cross-cutting that are pulled off. The evaluation is done according to the standard for the cross-cut test (DIN EN ISO 2409). A cross-cut characteristic between G 0 and G 5 is determined from the FIGURE in the Standard by visual evaluation. At G 0 the cut edges are completely smooth and none of the squares in the cross-cut are removed. At G 1, small fragments of the coating peel off at the intersections of the cross-cut lines. The area that peels off is not significantly greater than 5% of the cross-cut area. Greater peeling of the coating give higher cross-cut characteristics.

Cross-cut testing according to DIN EN ISO 2409. This test is done as for the adhesion test described above, after indenting, but without deformation of the sheet by the indenting.

Light resistance by ECCA Test Method T10. The sheets are exposed cyclically in a test chamber to light, water, elevated temperature, and damp atmosphere. The sheets are irradiated with a UV-B lamp for a total of 500 hours. The subsequent evaluation is done according to German Standard DIN 53230, according to Table 2 in the standard, with a relative evaluation scale from 0 to 5: Characteristic number 0: not changed; characteristic number 1: trace of change; characteristic number 2: slightly changed; characteristic number 3: moderately changed; characteristic number 4: severely changed; characteristic number 5: very severely changed.

The following tables contain the test results. Formulas number 2, 19 and 20 are comparative examples not made according to the invention (no, or insufficient, aliphatic urethane baking resin). The other formulas are according to the invention. Concentrations are in percent by weight.

TABLE 1A

Formulations of Examples 1-18

| Ingredients | 1 | 2* | 3 | 4 | 5 | 6 | 7 | 8 | 9 |
|---|---|---|---|---|---|---|---|---|---|
| Blocked, aliphatic cross-linking urethane baking resin based on hexamethylene diisocyanate | 12.5 | | | | | 12.5 | | | 18.0 |
| Blocked, aliphatic cross-linking urethane baking resin based on isophorone diisocyanate | | | 12.5 | 12.5 | 13.0 | | 11.5 | 12.5 | |
| Blocked, aromatic cross-linking urethane baking resin based on toluylene diisocyanate | | 12.5 | | | | | | | |
| Synthetic amorphous silicic acid, modified with calcium ions | 14.2 | 15.0 | | 14.0 | 15.0 | | 6.0 | 14.0 | 15.0 |
| Multiphase pigment based on zinc phosphate, containing organic inhibitors | | | 15.5 | | | 29.0 | | | |
| Multiphase pigment based on zinc phosphate | | | | | | | | | |
| Pyrogenic silicic acid >99.5% Silicon dioxide | 1.3 | 1.0 | 1.5 | 1.0 | | | 0.5 | 1.0 | |
| Polyacrylate containing hydroxyl groups | | 23.5 | | | | | | | |
| Linear, aliphatic polycarbonate polyester | | | | 23.5 | | | | | |
| Linear, aliphatic polycarbonate diol | 23.5 | | 23.5 | | | | 10.0 | 22.0 | |
| Polyether | | | | | 18.0 | | | | |
| Saturated polyester, high molecular weight, hydroxyl-functional M = 10,000-30,000 g/mol | | | | | | 12.0 | 5.0 | | 12.0 |
| Saturated polyester, low molecular weight, hydroxyl-functional, M = 1,000-7,000 g/mol | | | | | | | 20.5 | | 2.0 |
| HMMM-resin (Melamine-Formaldehyde resin) | | | | | | 10.0 | | | 0.7 |

TABLE 1A-continued

Formulations of Examples 1-18

| Ingredient | | | | | | | | | |
|---|---|---|---|---|---|---|---|---|---|
| 1-Methoxy-2-propanol | 14.2 | 3.4 | 5.4 | 5.4 | 5.6 | 11.1 | 4.9 | 5.4 | 9.1 |
| 2-Methoxy-1-methylethyl acetate | 5.9 | 18.0 | | 22.3 | 13.5 | | 17.1 | 15.3 | 12.9 |
| Butyl diglycol acetate | | | 16.2 | | | 12.0 | 5.0 | | 12.0 |
| Dibasic ester | 25.5 | 14.0 | 7.4 | | 23.4 | | 25.0 | 25.0 | 15.0 |
| n-Butyl acetate | | 10.0 | | 5.8 | | 2.9 | | 3.9 | 4.0 |
| Solvesso 100 (C$_{9-10}$-hydrocarbon, aromatic) | 2.9 | 2.6 | | 15.5 | 1.5 | | 15.0 | | |
| Solvesso 150 (C$_{10-11}$-hydrocarbon, aromatic) | | | 18.0 | | | | | | |
| Isobutanol | | | | | | | | 0.2 | |
| Total | 100 | 100 | 100 | 100 | 100 | 100 | 100 | 100 | 100 |

| Ingredients | 10 | 11 | 12 | 13 | 14 | 15 | 16 | 17 | 18 |
|---|---|---|---|---|---|---|---|---|---|
| Blocked, aliphatic cross-linking urethane baking resin based on hexamethylene diisocyanate | | | | | | | 12 | | |
| Blocked, aliphatic cross-linking urethane baking resin based on isophorone diisocyanate | 12.5 | 12.5 | 12.5 | | 7 | 14 | | 30 | |
| Blocked, aromatic cross-linking urethane baking resin based on toluylene diisocyanate | | | | | | | | | |
| Synthetic amorphous silicic acid, modified with calcium ions | 7.1 | 14.2 | 14.2 | 15 | | | | 13.5 | |
| Multiphase pigment based on zinc phosphate, containing organic inhibitors | 7.1 | | | | 12 | 12 | | | 15 |
| Multiphase pigment based on zinc phosphate | | | | | | | 4.5 | | |
| Pyrogenic silicic acid >99.5% Silicon dioxide | 1.3 | 2.0 | 1.3 | 1 | 1.5 | | | | 1.5 |
| Polyacrylate containing hydroxyl groups | 23.5 | | | | | | 20 | | |
| Linear, aliphatic polycarbonate polyester | | | | | | | | 10 | |
| Linear, aliphatic polycarbonate diol | | 22.5 | 23.5 | | | | | | |
| Polyether | | | | | | | | | |
| Saturated polyester, high molecular weight, hydroxyl-functional M = 10,000-30,000 g/mol | | | | 30 | 23 | 20 | | | 15 |
| Saturated polyester, low molecular weight, hydroxyl-functional, M = 1,000-7,000 g/mol | | | | 5 | 5 | 5 | | | |
| HMMM-resin (Melamine-Formaldehyde resin) | | 0.7 | 1.0 | 10 | 10 | 6 | 1 | | 10 |
| 1-Methoxy-2-propanol | 5.4 | 5.4 | 5.4 | 2.7 | 7.1 | 8.7 | 5.3 | 12.8 | 11.5 |
| 2-Methoxy-1-methylethyl acetate | 12.3 | 2.9 | 3.8 | | 5.2 | | 18 | 5 | 6.5 |
| Butyl diglycol acetate | 5.2 | 5.0 | 18.0 | 30 | 23 | 20 | 16.7 | 15.3 | 26 |
| Dibasic ester | 25.0 | 15.0 | 20.0 | | 3.7 | 12 | 9 | 13.4 | |
| n-Butyl acetate | 0.6 | 5.3 | | 3.8 | | 0.8 | 2.7 | | |
| Solvesso 100 (C$_{9-10}$-hydrocarbon, aromatic) | | 14.0 | | | | | | | |
| Solvesso 150 (C$_{10-11}$-hydrocarbon, aromatic) | | | | | | | | | |
| Isobutanol | | 0.2 | 0.3 | 2.5 | 2.5 | 1.5 | 0.3 | | 2.5 |
| Total | 100 | 100 | 100 | 100 | 100 | 100 | 90 | 100 | 88 |

*Denotes a comparative example.

TABLE 1B

Examples 1 to 18 - Binder:Solvent: Pigment Amounts; Solids:Binder content; Pigment:Binder Ratio

| Formula number: | 1 | 2* | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Binder content | 36.0 | 36.0 | 36.0 | 36.0 | 41.0 | 45.0 | 26.5 | 35.2 | 32.0 | 36.0 | 35.7 | 37.0 | 45.0 | 45.0 | 45.0 | 33.0 | 40.0 | 25.0 |
| Solvent content | 48.5 | 48.0 | 47.0 | 49.0 | 44.0 | 26.0 | 67.0 | 49.8 | 53.0 | 48.5 | 47.8 | 47.5 | 39.0 | 41.5 | 43.0 | 52.0 | 46.5 | 46.5 |
| Pigment content | 15.5 | 16.0 | 17.0 | 15.0 | 15.0 | 29.0 | 6.5 | 15.0 | 15.0 | 15.5 | 16.2 | 15.5 | 16.0 | 13.5 | 12.0 | 4.5 | 13.5 | 16.5 |
| Ratio of Pigment/Binder | 0.43 | 0.44 | 0.47 | 0.42 | 0.37 | 0.64 | 0.25 | 0.43 | 0.47 | 0.43 | 0.45 | 0.42 | 0.36 | 0.30 | 0.27 | 0.14 | 0.34 | 0.66 |
| Solids | 51.5 | 52.0 | 53.0 | 51.0 | 56.0 | 74.0 | 33.0 | 50.2 | 47.0 | 51.5 | 51.9 | 52.5 | 61.0 | 58.5 | 57.0 | 37.5 | 53.5 | 41.5 |

TABLE 1C

Examples 1 to 18 - Test Results

| Formula number: | 1 | 2* | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Condensate water cycling test DIN 50017 KFW | >25 | >25 | 20 | >25 | 25 | 20 | 15 | >25 | >25 | 20 | 20 | 25 | 25 | 20 | 20 | 5 | >25 | 20 |
| Adhesion after indenting DIN EN ISO 13523-6 | G0 | G0 | G0 | G0-1 | G0 | G0-1 | G0-1 | G0-1 | G0 | G0 | G0 | G0 | G2 | G2 | G0-1 | G0-1 | G0 | G2 |
| Cross-cut DIN EN ISO 2409 | G0 | G0 | G1 | G0-1 | G0 | G0 | G0-1 | G0-1 | G0 | G0 | G0 | G0 | G2 | G0-1 | G0-1 | G0-1 | G0 | G2 |
| ECCA T10, 500 hr UV-B, Evaluation by DIN 53230, Table 2, Relative evaluation scale | 1 | 4 | 1 | 0 | 1 | 0 | 0 | 0 | 0 | 0 | 0 | 0 | 0 | 0 | 0 | 1 | 0 | 1 |

TABLE 2A

Formulations of Examples 19-36

| Ingredients | 19* | 20* | 21 | 22 | 23 | 24 | 25 | 26 | 27 |
|---|---|---|---|---|---|---|---|---|---|
| Blocked, aliphatic cross-linking urethane baking resin based on hexamethylene diisocyanate | 6.3 | | | | | 12.5 | | | 11.0 |
| Blocked, aliphatic cross-linking urethane baking resin based on isophorone diisocyanate | | 6.3 | 12.5 | 12.5 | 13.0 | | 11.5 | 12.5 | 7.0 |
| Blocked, aromatic cross-linking urethane baking resin based on toluylene diisocyanate | 6.3 | 6.3 | | | | | | | |
| Synthetic amorphous silicic acid, modified by calcium ions | 14.2 | 15.0 | | 14.0 | 15.0 | 13.0 | 6.0 | 14.0 | 15.0 |
| Multiphase pigment based on zinc phosphate, containing organic inhibitors | | | 15.5 | | | | | | |
| Multiphase pigment based on zinc phosphate | | | | | | | | | |
| Pyrogenic silicic acid >99.5% silicon dioxide | 1.3 | 1.0 | 1.5 | 1.0 | | | 0.5 | 1.0 | |
| Polyacrylate containing hydroxyl groups | | 23.5 | | | | | | | |
| Linear, aliphatic polycarbonate polyester | | | | 23.5 | | | | | |
| Polyether | | | 11.5 | | 12.5 | | 5.0 | | |
| Saturated polyester, high molecular weight, hydroxyl-functional, M = 10,000-30,000 g/mol | | | | | | 12.0 | 5.0 | 4.0 | 12.0 |
| Saturated polyester, low molecular weight, hydroxyl-functional, M = 1,000-7,000 g/mol | | | | | | 10.5 | | 2.0 | |
| HMMM-resin (Melamine-Formaldehyde resin) | | | | | | | | 0.7 | |

TABLE 2A-continued

Formulations of Examples 19-36

| Ingredients | 19 | 20 | 21 | 22 | 23 | 24 | 25 | 26 | 27 |
|---|---|---|---|---|---|---|---|---|---|
| 1-Methoxy-2-propanol | 18.0 | 10.5 | 12.0 | 10.6 | 15.0 | 10.2 | 19.0 | 12.0 | 9.0 |
| 2-Methoxy-1-methylethyl acetate | 12.0 | 4.4 | 5.4 | 5.4 | 5.6 | 16.9 | 4.9 | 5.4 | 16.5 |
| Butyl diglycol acetate | | | | 11.0 | 13.0 | 10.0 | 13.1 | | 11.5 |
| Dibasic ester | 12.0 | 23.0 | 25.0 | 22.0 | 15.9 | 12.0 | 25.0 | 18.9 | 12.0 |
| n-Butyl acetate | 5.0 | 10.0 | | | | | | 6.8 | |
| Solvesso 100 ($C_{9-10}$-hydrocarbon, aromatic) | 1.5 | | 5.1 | | | 2.9 | | | 4.0 |
| Solvesso 150 ($C_{10-11}$-hydrocarbon, aromatic) | | | | | | | | 5.0 | 6.5 |
| Isobutanol | | | | | | | | | 0.2 |
| Total | 100 | 100 | 100 | 100 | 100 | 100 | 100 | 100 | 100 |

| Ingredients | 28 | 29 | 30 | 31 | 32 | 33 | 34 | 35 | 36 |
|---|---|---|---|---|---|---|---|---|---|
| Blocked, aliphatic cross-linking urethane baking resin based on hexamethylene diisocyanate | | 6.5 | | 12.5 | | | 12.0 | 15.0 | 6.3 |
| Blocked, aliphatic cross-linking urethane baking resin based on isophorone diisocyanate | 12.5 | 6.3 | 12.5 | | 14.0 | 13.5 | | 15.0 | |
| Blocked, aromatic cross-linking urethane baking resin based on toluylene diisocyanate | | | | | | | | | |
| Synthetic amorphous silicic acid, modified by calcium ions | 7.1 | 14.2 | 14.2 | 15 | | | 10 | 13.5 | |
| Multiphase pigment based on zinc phosphate, containing organic inhibitors | 7.1 | | | | 12 | 12 | | | 12 |
| Multiphase pigment based on zinc phosphate | | | | | | | 5 | | |
| Pyrogenic silicic acid >99.5% silicon dioxide | 1.3 | 1.3 | 1.3 | 1 | 1.5 | | | | 1.5 |
| Polyacrylate containing hydroxyl groups | 18.0 | | 13.5 | | | | 20.0 | | 12.0 |
| Linear, aliphatic polycarbonate polyester | | | | | | | | 10.0 | |
| Polyether | 5.5 | | | | | | | | |
| Saturated polyester, high molecular weight, hydroxyl-functional, M = 10,000-30,000 g/mol | | | | 25.0 | 13.0 | 20.0 | | | 10.0 |
| Saturated polyester, low molecular weight, hydroxyl-functional, M = 1,000-7,000 g/mol | | | | 5.0 | 5.0 | 5.0 | | | |
| HMMM-resin (Melamine-Formaldehyde resin) | | 0.7 | 1.0 | 10.0 | 10.0 | 6.0 | 1.0 | | 3.1 |
| 1-Methoxy-2-propanol | 13.5 | 12.3 | 12.3 | | 4.8 | 13.0 | 16.1 | 13.5 | |
| 2-Methoxy-1-methylethyl acetate | 5.4 | 13.4 | 5.4 | 8.0 | 14.2 | 8.5 | 5.3 | 12.8 | 4.6 |
| Butyl diglycol acetate | 12.5 | 10.2 | 5.2 | 5.0 | | | 12.0 | 8.3 | |
| Dibasic ester | 0.6 | 9.5 | 24.3 | 16.0 | 23.0 | 20.0 | 7.1 | 11.9 | 26.0 |
| n-Butyl acetate | 11.0 | | | | | | 8.6 | | 5.0 |
| Solvesso 100 ($C_{9-10}$-hydrocarbon, aromatic) | 5.5 | 2.9 | | | | | 2.7 | | |
| Solvesso 150 ($C_{10-11}$-hydrocarbon, aromatic) | | | | | | | | | |
| Isobutanol | | 0.2 | 0.3 | 2.5 | 2.5 | 1.5 | 0.3 | | 2.5 |
| Total | 100 | 100 | 100 | 100 | 100 | 100 | 100 | 100 | 83 |

*Denotes a comparative example.

TABLE 2B

Examples 19 to 36 - Binder:Solvent: Pigment Amounts; Solids:Binder content; Pigment:Binder Ratio

| Formula number: | 19* | 20* | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| Binder content | 36.0 | 36.1 | 24.0 | 36.0 | 35.5 | 35.0 | 26.5 | 35.2 | 32.0 | 36.0 | 36.0 | 37.0 | 52.5 | 42.0 | 45.0 | 33.0 | 40.0 | 31.4 |
| Solvent content | 48.5 | 47.9 | 47.5 | 49.0 | 49.5 | 52.0 | 67.0 | 49.8 | 53.0 | 48.5 | 48.5 | 47.5 | 31.5 | 44.5 | 43.0 | 52.0 | 46.5 | 38.1 |
| Pigment content | 15.5 | 16.0 | 17.0 | 15.0 | 15.0 | 13.0 | 6.5 | 15.0 | 15.0 | 15.5 | 15.5 | 15.5 | 16.0 | 13.5 | 12.0 | 15.0 | 13.5 | 13.5 |

TABLE 2B-continued

Examples 19 to 36 - Binder:Solvent: Pigment Amounts; Solids:Binder content; Pigment:Binder Ratio

| | Formula number: | | | | | | | | | | | | | | | | | |
|---|---|---|---|---|---|---|---|---|---|---|---|---|---|---|---|---|---|---|
| | 19* | 20* | 21 | 22 | 23 | 24 | 25 | 26 | 27 | 28 | 29 | 30 | 31 | 32 | 33 | 34 | 35 | 36 |
| Ratio Pigment/Binder | 0.43 | 0.44 | 0.71 | 0.42 | 0.42 | 0.37 | 0.25 | 0.43 | 0.47 | 0.43 | 0.43 | 0.42 | 0.30 | 0.32 | 0.27 | 0.45 | 0.34 | 0.43 |
| Solids | 51.5 | 52.1 | 41.0 | 51.0 | 50.5 | 48.0 | 33.0 | 50.2 | 47.0 | 51.5 | 51.5 | 52.5 | 68.5 | 55.5 | 57.0 | 48.0 | 53.5 | 44.9 |

TABLE 2C

Examples 19 to 36 - Test Results

| | Formula number: | | | | | | | | | | | | | | | | | |
|---|---|---|---|---|---|---|---|---|---|---|---|---|---|---|---|---|---|---|
| | 19* | 20* | 21 | 22 | 23 | 24 | 25 | 26 | 27 | 28 | 29 | 30 | 31 | 32 | 33 | 34 | 35 | 36 |
| Condensate cycling test DIN 50017 KFW | >25 | >25 | 25 | >25 | 25 | 20 | 15 | >25 | >25 | 20 | 20 | 25 | >25 | 20 | 20 | 25 | >25 | 20 |
| Adhesion After indenting DIN EN ISO 13523-6 | G0 | G0 | G0 | G0-1 | G0 | G0-1 | G0-1 | G0 | G0 | G0 | G0 | G0 | G0 | G0 | G0 | G0-1 | G0 | G2 |
| Cross-cut DIN EN ISO 2409 | G0 | G0 | G0 | G0-1 | G1 | G0 | G0-1 | G0 | G0 | G0 | G0 | G1 | G0 | G0 | G0 | G0-1 | G0 | G2 |
| ECCA T10, 500 hr UV-B, Evaluation by DIN 53230, Table 2, Relative evaluation scale | 3 | 3 | 1 | 0 | 1 | 0 | 0 | 0 | 0 | 0 | 0 | 0 | 0 | 0 | 0 | 1 | 0 | 1 |

The coating coverage was 10 mg Ti per square meter.

What is claimed is:

1. A process for coating metal substrates, in which the metal is cleaned, if necessary, comprising steps of:
   a) contacting a metal substrate with a conversion solution comprising at least one simple or complex salt of at least one metal M, such that a conversion layer that contains 0.01 to 0.7 mmol/m² of metal M is produced;
   b) optionally flushing with water and/or drying the metal substrate;
   c) applying to said conversion layer on said metal substrate a coating agent comprising:
      c1) 5 to 30 percent by weight of one or more aliphatic cross-linking urethane resins;
      c2) 10 to 30 percent by weight of one or more cross-linking agents for c1);
      c3) 4 to 30 percent by weight of one or more corrosion-protection pigments, with the remainder of the coating agent comprising one or more organic solvents and/or water, and optionally other active and/or auxiliary substances;
   wherein no more than 5% of carbon atoms in said resin are present in aromatic and/or unsaturated groups and
   d) curing the coating applied on the conversion layer on the metal substrate in step c) by heating to a substrate temperature of at least 100° C.

2. The process according to claim 1, wherein an acidic aqueous chromium-free solution comprising the metal M in the form of complex fluorides is used for the conversion solution of a).

3. The process according to claim 1, further comprising at least one additional step selected from:
   preweathering the metal substrate prior to step a);
   shaping the metal substrate prior to step a) and/or after step d); and
   brazing the metal substrate after step d).

4. The process according to claim 1, wherein the aliphatic cross-linking urethane resins c1) are blocked with a protective group that separates at a temperature in the range of 100 to 180° C.

5. The process according to claim 1, wherein the cross-linking agents c2 are selected from polyacrylates, polyethers, polyesters, polycarbonates, polycarbonate-polyesters that contain hydroxyl groups, and mixtures thereof.

6. The process according to claim 1, wherein the corrosion-protection pigments c3) are selected from inorganic solids comprising cations of bivalent or multivalent metals, selected such that said bivalent or multivalent metals exchange for alkali metal ions thereby forming compounds with hydroxyl ions occurring upon corrosion of the metal surface.

7. The process according to claim 1, wherein the coating agent in step c) has a solids content of at least 30 percent by weight and not more than 80 percent by weight.

8. The process according to claim 1, wherein the weight ratio of c3 to (c1+c2) is at least 0.1 and is not more than 0.75.

9. The process according to claim, wherein the metal substrate is coated in the form of a continuous strip and steps a) and c) are accomplished in a roller-coating method, with no rinsing with water done between said steps and curing step d).

10. A process for coating metal substrates, in which the metal is cleaned if necessary, comprising steps of:
   a) contacting a metal substrate with a conversion solution comprising at least one simple or complex salt of at least one metal M selected from the group consisting of Ti, Zr, B, Si, Hf and mixtures thereof, such that a conversion layer that contains 0.01 to 0.7 mmol/m² of metal M is produced;

b) optionally flushing with water and/or drying said metal substrate;

c) applying to said conversion layer on said metal substrate a coating agent comprising:
- c1) 5 to 30 percent by weight of one or more aliphatic cross-linking urethane resins consisting of polyurethane prepolymers comprising blocked isocyanate groups and having no more than 1% of carbon atoms present in aromatic and/or unsaturated groups;
- c2) 10 to 30 percent by weight of one or more cross-linking agents for c1);
- c3) 4 to 30 percent by weight of one or more corrosion-protection pigments, with the remainder of the coating agent comprising one or more organic solvents and/or water, and optionally other active and/or auxiliary substances; and d) curing the coating produced on the conversion layer on the metal substrate in step c) by heating.

11. The process according to claim 10, wherein an acidic aqueous chromium-free solution comprising the at least one metal M in the form of complex fluorides is used for the conversion solution of a).

12. The process according to claim 11, wherein the metal substrate is selected from aluminum and its alloys, zinc and its alloys, and galvanized or alloy-galvanized steel.

13. The process according to claim 12, wherein the cross-linking agents c2 are selected from polyacrylates, polyethers, polyesters, polycarbonates, polycarbonate-polyesters that contain hydroxyl groups, and mixtures thereof.

14. The process according to claim 13, wherein the corrosion-protection pigments c3) are selected from inorganic solids comprising cations of bivalent or multivalent metals.

15. The process according to claim 13, wherein the coating agent in step c) has a solids content of at least 40 percent by weight and not more than 70 percent by weight.

16. The process according to claim 15, wherein the weight ratio of c3 to (c1+c2) is at least 0.2 and is not more than 0.6.

* * * * *